United States Patent

Alsch

[15] 3,668,892

[45] June 13, 1972

[54] FLEXIBLE DRIVE COUPLING

[72] Inventor: Richard E. Alsch, Lannon, Wis.

[73] Assignee: Graham Transmissions, Inc., Menomonee Falls, Wis.

[22] Filed: Oct. 29, 1969

[21] Appl. No.: 872,043

[52] U.S. Cl. ................................................64/14, 64/11
[51] Int. Cl. ............................................F16d 3/64
[58] Field of Search ..................................64/14, 13, 12, 11

[56] References Cited

UNITED STATES PATENTS

| | | | |
|---|---|---|---|
| 1,511,390 | 10/1924 | Bethel | 64/14 |
| 2,295,003 | 9/1942 | Natkins | 64/14 |

Primary Examiner—Benjamin W. Wyche
Assistant Examiner—Randall Heald

Attorney—John W. Michael, Gerrit D. Foster, Bayard H. Michael, Paul R. Puerner, Joseph A. Gemignani, Andrew O. Riteris, Daniel Van Dyke and Spencer B. Michael

[57] ABSTRACT

A drive coupling between two rotatable members in a drive system is provided wherein each of the members includes a pair of angularly spaced V-shaped axial projections. The V-shaped projections on one member are arranged between the V-shaped projections on the other member and together define a generally X-shaped opening therebetween. An X-shaped member of flexible material is arranged in the opening to provide a drive connection between the members. The coupling is used in the drive train of a belt or motorized drive to a gear reducer and in a variable transmission of the disc and ball galaxy type. A flexible coupling together with clearance provide for limited movement between an input member and its connection in the drive train to achieve desired bearing loading.

8 Claims, 4 Drawing Figures

Inventor
Richard E. Alsch
By Joseph A. Genigeni
Attorney

Inventor
Richard E. Alsch
By Joseph A. Genovese
Attorney

FLEXIBLE DRIVE COUPLING

BACKGROUND OF INVENTION

This invention relates to drive couplings and, more particularly, to a flexible drive coupling.

A problem encountered in various drive arrangements is to provide for proper bearing arrangement or to permit transmission elements to properly align themselves for more effective motion transmission without adversely affecting the drive arrangement or disturbing the drive coupling. Or, in other words, to provide effective motion transmission through a coupling without adversely affecting bearing arrangements or preventing proper alignment of the transmission elements. For example, it has been recognized as desirable to maintain an effective input drive coupling to a disc and ball galaxy transmission while accommodating some movement to permit alignment of the transmission elements or to permit a transmission element, which is connected to either a motorized or belt driven input, to assume a most effective orientation without adversely affecting the bearing arrangement supporting that transmission element.

SUMMARY OF INVENTION

A general object of this invention is to provide an improved flexible coupling and, more particularly, one which can be used effectively to achieve proper alignment of transmission elements and efficient bearing arrangements while maintaining an effective drive coupling.

For the achievement of these and other objects, this invention proposes a flexible coupling wherein two members are each provided with surfaces having both a generally axial and radial extension. The surfaces are arranged in relative spaced relation with a flexible connector therebetween to establish a resilient drive connection between the two members.

This coupling is used in a disc and ball galaxy variable transmission in association with a spring support for one of the discs which permits the discs and ball galaxy to properly align themselves while the flexible coupling maintains an effective drive coupling.

Similarly, the coupling is used to permit a shaft member connected to a motorized input to have sufficient clearance so as not to interfere with the bearing support of either the motor or the other drive coupling members.

Also, the coupling is used to permit an input member to properly align itself without affecting the drive connection. In this regard, one of the members carrying the generally axial and radial surface has a cylindrical surface fitting into a bore. That surface also has a transverse radius with a sliding fit in the bore to permit the member to pivot in the bore on that surface without affecting the drive connection.

DESCRIPTION OF PREFERRED EMBODIMENT

Figure 1:
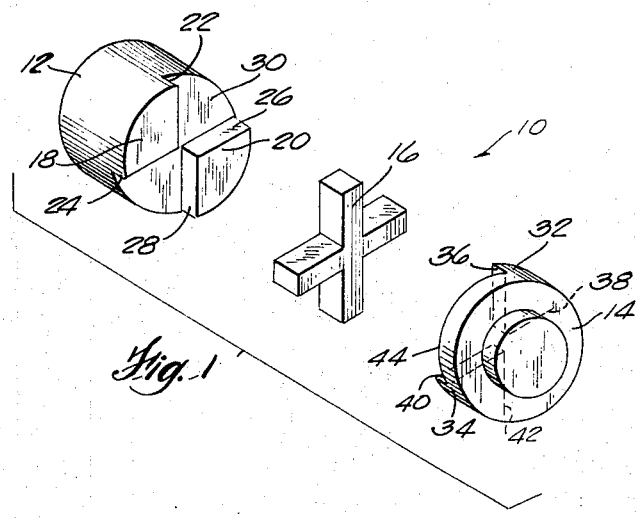
FIG. 1 is an exploded perspective view of the flexible coupling members embodying this invention.

With particular reference to FIG. 1, flexible coupling 10 includes three basic elements, members 12 and 14, which can be of any suitable material for example sintered, and a generally X-shaped member made of suitable resilient material such as rubber.

Sintered member 12 includes two generally V or pie-shaped segments 18 and 20. Segment 18 includes surfaces 22 and 24 and segment 20 includes surfaces 26 and 28, each of these surfaces extending from an axially directed portion 30 of the sintered member and each having both a generally axial and radial extension. Surface 22 is spaced from surface 26 and similarly surface 24 is spaced from surface 28 defining a generally "hour glass" type opening at the end of sintered member 12.

Similarly, member 14 includes two V or pie-shaped segments 32 and 34. Segment 32 includes surfaces 36 and 38 and segment 34 includes surfaces 40 and 42. Each of these surfaces projects from an axially directed portion 44 of segment 14 and each also has both a generally axial and radial extension. Again segments 32 and 34 define a generally "hour glass" opening therebetween.

In assembling the members to complete the drive coupling, members 12 and 14 are brought into close association with segments 32 and 34 disposed in the hour glass opening defined between segments 18 and 20 of member 12 and vice versa. When so assembled the generally axial and radial extending surfaces of both members are in confronting relationship but are spaced from each other. More specifically, surfaces 22-24 and 26-28 confront and are spaced from surfaces 36-40 and 38-42 defining a generally X-shaped opening therebetween. Member 16 fits into the X-shaped opening and provides a resilient drive connection between these two members.

This basic flexible coupling is relatively simple and yet provides an effective drive coupling in either direction of rotation and one which permits considerable displacement of one of the members 12 and 14 with respect to the other without interrupting the drive connection.

Figure 4:
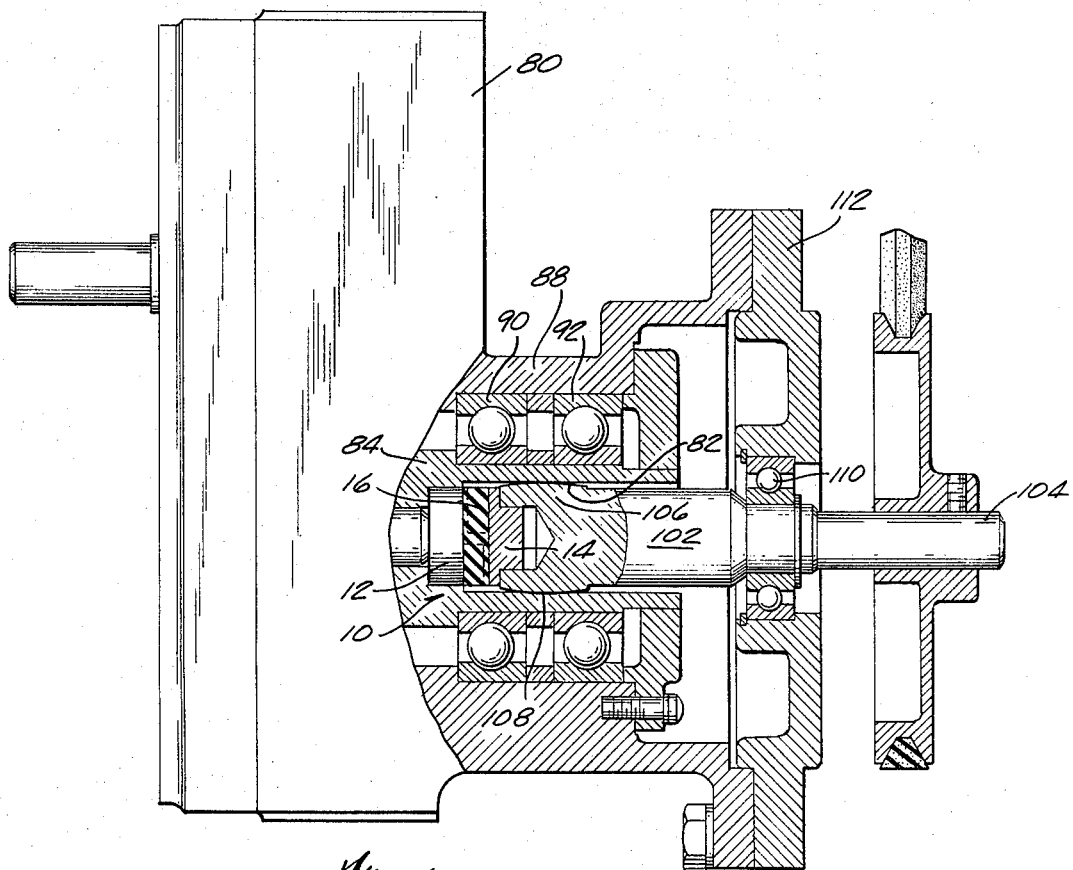
FIG. 4 is an axial section through a belt driven version of a drive to a gear reducer again incorporating the flexible coupling of this invention.
Figure 3:
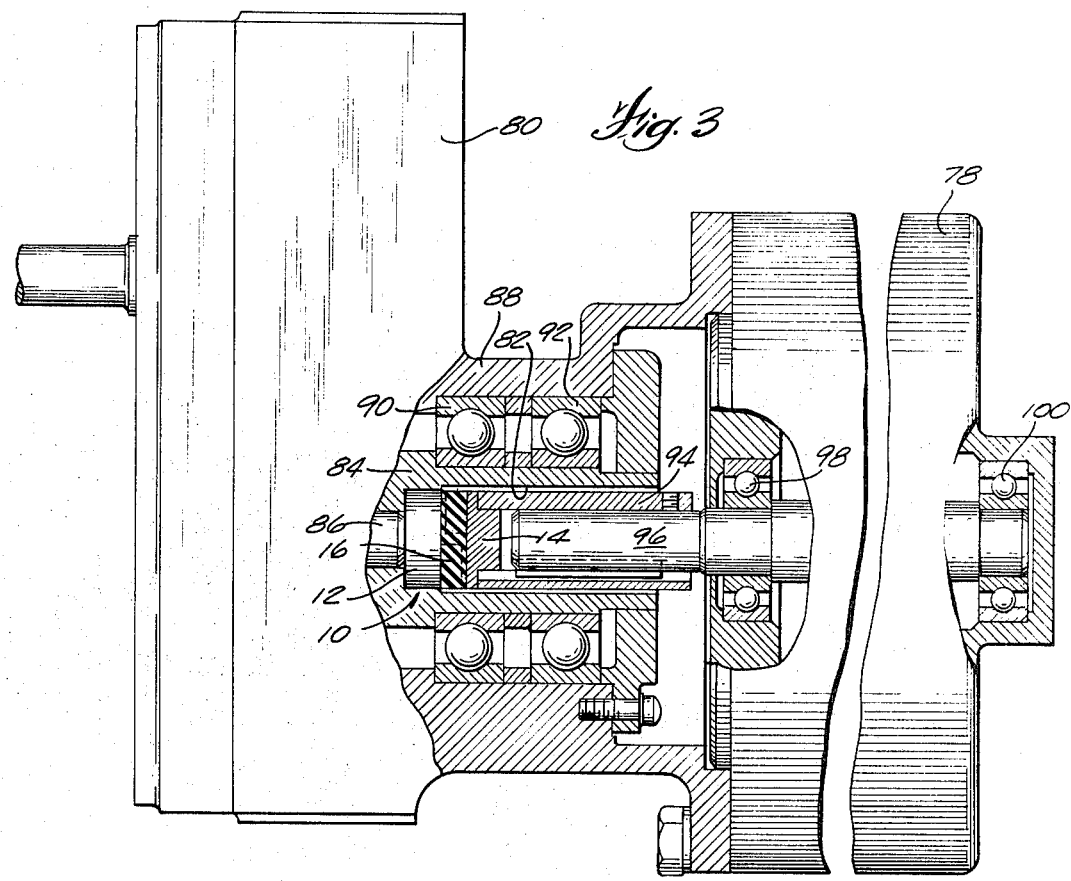
FIG. 3 is a side elevation of a motorized drive through a gear reducer embodying the flexible coupling of this invention and with parts broken away to better illustrate the flexible coupling.
Figure 2:
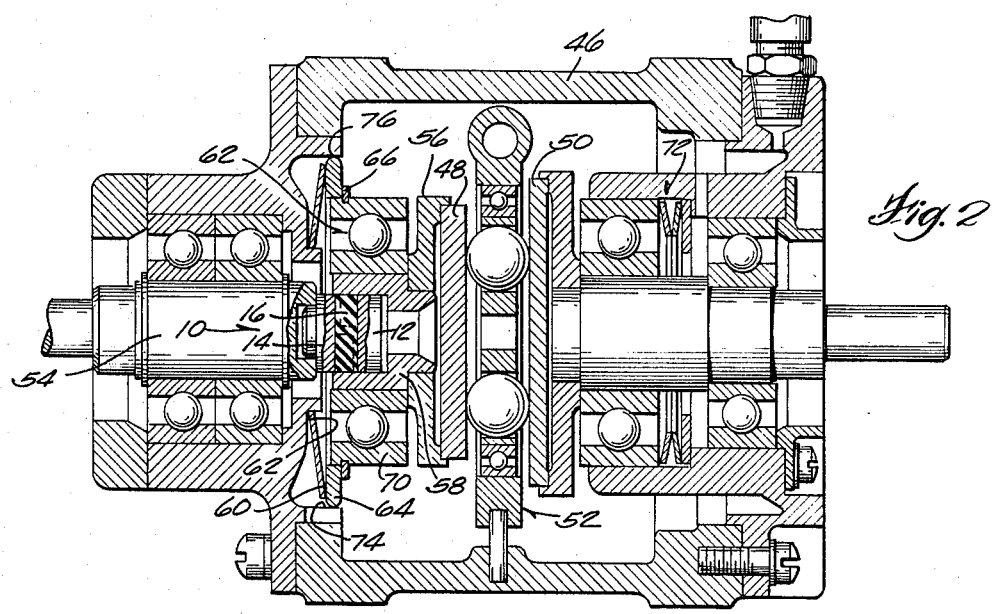
FIG. 2 is an axial section of a disc and ball galaxy type variable transmission incorporating this invention.

FIGS. 2-4 illustrate the flexible coupling in three typical embodiments.

Reference will first be made to FIG. 2 where the flexible coupling is disclosed as embodied in a variable transmission of the disc and ball galaxy type. Generally, the variable transmission includes housing 46, input disc 48, output disc 50, and a ball galaxy assembly 52 engaged between the two discs. Input disc 48 is connected to input shaft 54 through retaining ring 56, hub 58 and flexible coupling 10. For convenience in identifying and relating the parts of the coupling to the elements illustrated in FIG. 1, the same numbers will be used to identify the flexible coupling elements from FIG. 1 in FIGS. 2, 3 and 4. In this embodiment, flexible member 12 is brazed within hub 58 which is in turn connected to retainer 56. Member 14 is brazed to input shaft 54 and member 16 is engaged between these two members.

The use of the flexible coupling in this environment is to permit the discs 48 and 50 to align themselves to assume a proper relation relative to each other and the ball galaxy for proper motion transmission. In this respect, it will be noted that spring 60 acts between a shoulder 62 and an annular member 64 which abuts ring 66 on bearing 68 to exert an axial force on the bearing. The bearing abuts retainer ring 56 and the spring force provided by spring 60 reacts against a spring arrangement 72 on the opposite side of the disc and ball galaxy assembly. Spring 60 and annular member 64 are arranged in a bore 74 and annular member 64 is provided with a peripheral edge 76 having a transverse radius, i.e. the edge is rounded. The transverse radius of edge 76 is less than the radius of bore 74 so that annular member 64 is free to pivot in the bore and thereby allow disc 48 to align itself relative to the ball galaxy and disc 50 and against spring 60. The flexible coupling permits this alignment of disc 48 without interfering with the input drive connection. The remainder of the variable transmission is generally conventional and its operation will be readily apparent from the drawings to those skilled in the art and hence it will not be described.

In FIG. 3 the flexible coupling is shown as establishing the drive connection between a suitable motor source and a gear reducer 80. In this embodiment, member 12 of the flexible coupling is brazed within bore 82 of a quill 84. The quill 84 has a suitable drive connection with an input shaft 86 to the gearing (not shown) in the gear reducer. Quill 82 is supported in housing 88 by bearings 90 and 92.

Sleeve 94 is connected to shaft 96 of motor 78. Flexible coupling member 14 is suitably connected to sleeve 94, again for example by brazing, so that movement of shaft 96 is transmitted to gear reducer shaft 86 through the flexible coupling. In this embodiment it will be noted that substantial clearance is provided between sleeve 94, in effect an input member to the flexible coupling, and the inner surface of bore 82. This clearance prevents an over location of the shaft 96 of the motor, which is already supported by two motor bearings 98 and 100. Without the clearance the bearings 98 and 100 might become overloaded. The flexible coupling permits this clearance while providing an effective drive coupling between the shaft or, more specifically, the sleeve and the gear reducer shaft.

In FIG. 4, shaft 102 is adapted to receive a pulley and be powered from a belt drive system. In this embodiment flexible coupling 10 again cooperates to transmit input movement to gear reducer 80, in this instance from a belt drive system. In this embodiment, quill 84 is supported in housing 88 by bearings 90 and 92. Since the arrangement of FIG. 4 is the same as FIG. 3 except for the type of input connection, the same reference numerals will be used in FIG. 4 as were used in FIG. 3 where the parts have been repeated. Input shaft 102 extends into bore 82 of the quill and carries a flexible coupling member 14. The connection between coupling member 14 and coupling member 12 is through the flexible member 16. In this embodiment, external forces will be applied to the exposed end 104 of shaft 102 because of the type of input drive, i.e. a belt drive. This force may have a tendency to cause the shaft 102 to attempt to pivot about its inner end which is located in bore 82. In order to accommodate these forces tending to produce this pivotal movement, the portion 106 of the shaft carrying member 14, which already has a generally cylindrical surface 108, is also provided with a transverse radius on surface 108, i.e. transverse in the sense of being arcuate in plane along the axis of shaft 102 as well as having the normal circular shape in a plane at right angles to that axis. The radius surface 108 is such as to provide a sliding fit in bore 82 so that the shaft 102 can pivot about surface 108 in response to the forces applied to shaft end 104. The flexible coupling accommodates this pivotal movement while maintaining an effective drive connection. Moreover, with the external non-motorized input, it is necessary to provide a two-bearing support for shaft 102, the engagement between surface 108 and inner bore 82 provides one bearing surface and bearing 110 in cover 112 provides the other. Bearing 110 is selected with a sufficient amount of play to permit radial movement within the bearing to accommodate the pivotal, or aligning, movement of shaft 102. This overall arrangement permits the shaft 102 to properly align itself and thereby prevent an over location which could result in improper loading and premature failure of either bearings 90–92 or 110. In connection with FIG. 4, it will be appreciated that although the flexible coupling is discussed specifically in connection with a belt drive embodiment it can be used with other types of non-motorized inputs for example, connected to a gear train with shaft 104 carrying one of the gears.

I claim:

1. A flexible coupling for transmitting rotary motion between two members and comprising in combination,
   a first member having an axially directed portion and including means defining a surface at said portion having both a generally axial and radial extension,
   a second member having an axially directed portion and including means defining a surface at said axially directed portion having both a generally axial and radial extension,
   said first and second members arranged with said axially directed portions thereof adjacent and with the surface on said first member spaced from and facing oppositely with respect to the surface on said second member,
   flexible means disposed in the space between said surfaces and establishing a driving connection between said first and second members so that rotation is transmitted between said first and second members through said flexible means,
   said first member includes means defining a generally cylindrical bore in said first member,
   said second member comprising an input member and extending into said bore,
   means defining clearance between said bore and said second member providing for limited relative movement between said first and second members transverse to the axis of said bore,
   and said flexible means further operative to take up said transverse movement in said flexible means so that said transverse movement is accommodated by said flexible means without interrupting the driving connection between said first and second members.

2. The flexible coupling of claim 1 wherein said surface on said first member axially overlaps and is in confronting relationship with said surface on said second member.

3. The flexible coupling of claim 2
   wherein said means defining said surface on said first member defines first and second surfaces each having both a generally axial and radial extension and circumferentially spaced apart and oppositely facing relative to each other to define an opening therebetween,
   wherein said means defining said surface on said second member defines first and second surfaces each having both a generally axial and radial extension and circumferentially spaced apart and oppositely facing relative to each other,
   said second member arranged with said first and second surfaces disposed in said opening and each of said surfaces thereof confronting and spaced from a respective one of said first and second surfaces on said second member,
   and wherein said flexible means is arranged within the spaces between said confronting surfaces of said first and second members.

4. The variable transmission of claim 1 wherein
   said first member includes first and second generally V-shaped projections at said axially directed portion, said V-shaped projections spaced circumferentially relative to each other and the sides of said V-shaped projections having both a generally axial and radial extension,
   said second member includes first and second generally V-shaped projections at said axially directed portion, said V-shaped projections spaced circumferentially relative to each other and the sides of said V-shaped projections having both a generally axial and radial extension,
   said V-shaped projections on said first member are disposed between the V-shaped projections on said second member with the sides of said V-shaped projections on said first and second members relatively spaced apart to define an opening therebetween,
   and said flexible means comprising a member generally conforming to and disposed in said opening.

5. The coupling of claim 1 wherein
   said axially directed portion of said first member is disposed in said bore,
   said second member extending into said bore with the portion thereof within said bore being generally cylindrical and the surface of said cylindrical portion having a transverse radius and a sliding fit in said bore to permit said second member to pivot on said cylindrical surface in said bore and thereby provide said limited relative movement between said first and second members.

6. The variable transmission of claim 1 wherein
   said first member includes first and second generally V-shaped projections at said axially directed portion, said V-shaped projections spaced circumferentially relative to each other and the sides of said V-shaped projections having both a generally axial and radial extension,
   said second member includes first and second generally V-shaped projections at said axially directed portion, said V-shaped projections spaced circumferentially relative to each other and the sides of said V-shaped projections having both a generally axial and radial extension, said V-shaped projections on said first member disposed between the V-shaped projections on said second member with the sides of said V-shaped projections spaced apart defining a generally X-shaped opening therebetween, and said flexible means comprising a generally X-shaped member in said X-shaped opening.

7. The combination of claim 1 wherein said axially directed portion of said first member is disposed within said bore, and said second member extending into said bore and having a generally cylindrical surface being spaced from and having substantial clearance with the cylindrical surface of said bore.

8. A flexible coupling for transmitting rotary motion between two members and comprising in combination, a first member having an axially directed portion and means defining a surface at said portion having both a generally axial and radial extension, a second member having an axially directed portion and including means defining a surface at said axially directed portion having both a generally axial and radial extension, said first and second members arranged with said axially directed portions thereof adjacent and with the surface on said first member spaced from and facing oppositely with respect to the surface on said second member, flexible means disposed in the space between said surfaces and establishing a driving connection between said first and second members so that rotation is transmitted between said first and second members through said flexible means, said first member includes means defining a generally cylindrical bore in said first member, said second member comprising an input member and extending into said bore, and said second member having a portion in said bore and having a transverse radius engaging the walls of said bore with said transverse radius providing clearance to permit limited movement of said second member in said bore accommodated by said flexible means without interrupting said drive connection.

* * * * *